(12) United States Patent
Lee

(10) Patent No.: US 6,762,815 B2
(45) Date of Patent: Jul. 13, 2004

(54) IN-PLANE SWITCHING LCD WITH A REDUNDANCY STRUCTURE FOR AN OPENED COMMON ELECTRODE AND A HIGH STORAGE CAPACITANCE

(75) Inventor: Deuk Su Lee, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 23 days.

(21) Appl. No.: 10/317,525

(22) Filed: Dec. 12, 2002

(65) Prior Publication Data

US 2004/0114082 A1 Jun. 17, 2004

(51) Int. Cl.[7] .................. G02F 1/1343; G02F 1/136
(52) U.S. Cl. ..................... 349/141; 349/38; 349/42
(58) Field of Search ..................... 349/38, 42, 141

(56) References Cited

U.S. PATENT DOCUMENTS 5,760,856 A * 6/1998 Yanagawa et al. ............. 349/42
6,137,557 A * 10/2000 Hebiguchi et al. ............ 349/141
6,452,656 B2 * 9/2002 Niwano et al. ................ 349/141

* cited by examiner

Primary Examiner—Julie-Huyen L. Ngo
(74) Attorney, Agent, or Firm—Thomas, Kayden, Horstemeyer & Risley

(57) ABSTRACT

An IPS-LCD array substrate has a redundancy structure for an opened common electrode line and a high storage capacitance. In each pixel unit area, a common electrode lines extends parallel to the signal line to overlap the signal line. A pixel electrode is parallel to the common electrode line. A common bus lines extends parallel to the gate line to overlap the gate line, and is electrically connected to the common electrode line. A complementary electrode pattern has a strip portion underneath and parallel to the pixel electrode, a bar portion parallel to the gate line and between the common bus line and the gate line, and an extension portion formed on the TFT and electrically connected to the pixel electrode. An insulator is sandwiched between the common electrode lines and the signal lines.

20 Claims, 13 Drawing Sheets

IN-PLANE SWITCHING LCD WITH A REDUNDANCY STRUCTURE FOR AN OPENED COMMON ELECTRODE AND A HIGH STORAGE CAPACITANCE

BACKGROUND OF THE INVENTION

1. Field of the Invention

The present invention relates to an in-plane switching liquid crystal display (IPS-LCD) and, more particularly, to an IPS-LCD with a redundancy structure for an opened common electrode line and a high storage capacitance.

2. Description of the Related Art

Twisted nematic liquid crystal display devices (TN-LCDs) having high image quality and low power consumption are widely applied to flat panel display devices. The TN-LCD, however, has a narrow viewing angle due to refractive anisotropy of liquid crystal molecules. To solve this problem, a multi-domain TN-LCD and a TN-LCD including an optical compensation film have been introduced. In such LCDs, however, contrast ratio is decreased and color shift is generated depending on viewing angle. Further, for the purpose of a wide viewing angle, an in-plane switching LCD (IPS-LCD) is also proposed, which is suggested to materialize wide viewing angle.

Recently, compared with the conventional TN-LCD, a drawback regarding to the transmittance is found in the IPS-LCD, and thus several of pixel structures have been developed for achieving a higher solution in the IPS-LCD. In one case, a resin insulator is formed between a signal line and a common electrode line to decrease the delay time of the signal line and minimize the coupling capacitance between the signal line and the common electrode line.

FIG. 1A is a plan view of a pixel structure of a conventional IPS-LCD. FIG. 1B is a sectional view according to line I—I of FIG. 1A. The IPS-LCD comprises a pair of glass substrates 12 and 14, and a liquid crystal layer 16 formed in a space between the two glass substrates 12 and 14. On the bottom glass substrate 12, a plurality of gate lines 18 and a plurality of signal lines 20 are perpendicularly arranged in a matrix form to define a plurality of pixels 22. In the pixel 22, a common electrode line 24 extends parallel to the signal lines 20 and overlaps the signal line 20, a thin film transistor (TFT) structure 26 is formed adjacent a cross point of the gate line 18 and the signal line 20, and a pixel electrode 28 is parallel to the common electrode line 24 in the center of the pixel 22.

The TFT 26 includes a gate electrode 26A protruded from the gate line 18, a gate insulating layer 19 formed on the gate electrode 26a, a channel layer 26b formed on the gate insulating layer 19, a source electrode 26c electrically coupled the signal line 20, and a drain electrode 26d electrically coupled one extension of the pixel electrode 28 through a via hole 27.

The ends of the common electrode lines 24 are electrically connected to a common bus line (not shown) that is a rectangular loop in the peripheral area of the bottom glass substrate 12. The other extension of the pixel electrode 28 is a bar 30 parallel to the gate line 18 and overlapping a predetermined area of the gate line 18, causing a storage capacitor structure. In general, the storage capacitor structure is applied to prevent the IPS-LCD 10 from a gray inversion, a flicker, and an afterimage. Also, the common electrode line 24, the pixel electrode 28 and the bar 30 are patterned on the same plane by using a transparent material, such as ITO or IZO.

Further, a passivation layer 21 is deposited to cover the gate insulating layer 19 and the signal lines 20, and a resin insulator 32 is formed between the passivation layer 21 and the common electrode lines 24. This resin insulator 32 decreases the delay time of the signal line 20, and minimizes the coupling capacitance between the signal line 20 and the common electrode line 24.

On the upper glass substrate 14, a black matrix 34 is formed to prevent light leakage generated from the TFT 26, the gate line 18, and the signal line 20. A color filter layer 36 and an over-coat layer 38 are formed on the black matrix 34 in sequence. In addition, a first alignment layer (not shown) and a second alignment layer (not shown) are formed on the inner surface of the bottom glass substrate 12 and the upper glass substrate 14, respectively, thus the liquid crystal layer 16 is filled between the two alignment layers.

The pixel structure with the resin insulator 32 of the IPS-LCD 10, however, has a drawback that different voltages are applied to the common bus line when a line defect is found in the common electrode line 24. FIG. 2A is a circuit diagram showing an opened common electrode line according to the pixel structure of FIG. 1A. FIG. 2B is a circuits diagram showing different resistances and voltage applied to the opened common electrode line of FIG. 2A. As shown in FIG. 2A, the ends of the gate lines 18 are electrically connected to gate pads 18a, and the ends of the signal lines 20 are electrically connected to signal pads 20a. Also, the end of the common electrode lines 24 are electrically connected to a common bus line 24a in the peripheral area. When a line defect point A is found in the common electrode line 24, the common electrode line 24 is opened. As shown in FIG. 2B, since the resistance of ITO is over about 200Ω, a first section 24I of a smaller length in the opened line has a smaller resistance R1, and a second section 24II of a greater length in the opened line has a larger resistance R2. Therefore, the voltage V1 applied to the first section 24I and the voltage V2 applied to the second section 24II are different, resulting in a great impact on an electrical performance of the IPS-LCD 10.

SUMMARY OF THE INVENTION

The present invention is an IPS-LCD with a redundancy structure for an opened common electrode and a high storage capacitance.

The IPS-LCD comprises a first substrate and a second substrate parallel to each other, and a liquid crystal layer disposed in a space between the first substrate and a second substrate. A plurality of gate lines and a plurality of signal lines are perpendicularly arranged in a matrix form on the first substrate to define a plurality of pixels. A plurality of TFTs is formed in the plurality of pixels, respectively. A redundancy pattern comprises a plurality of common electrode lines extending parallel to the signal lines and a plurality of common bus lines extending parallel to the gate lines, in which the common electrodes overlap the signal lines respectively, the common bus lines overlap the gate lines respectively, and the common bus lines are electrically connected to the common electrode lines. A plurality of pixel electrodes are disposed parallel to the common electrode lines in the plurality of pixels, respectively. A plurality of complementary electrode patterns is formed in the plurality of pixels respectively. An insulator is sandwiched between the common electrode lines and the signal lines. The signal lines and the complementary electrode patterns are formed on the same plane, the common electrode lines, and the pixel electrodes and the common bus lines are patterned on the same plane.

Accordingly, it is a principal object of the invention to provide means to achieve a higher resolution.

It is another object of the invention to decrease the delay time of the signal line.

Yet another object of the invention is to minimize the coupling capacitance between the signal line and the common electrode line.

It is a further object of the invention to provide two storage capacitor structures to achieve a higher capacitance.

Still another object of the invention is to provide a redundancy structure for an opened common electrode line.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE INVENTION

Figure 1A:
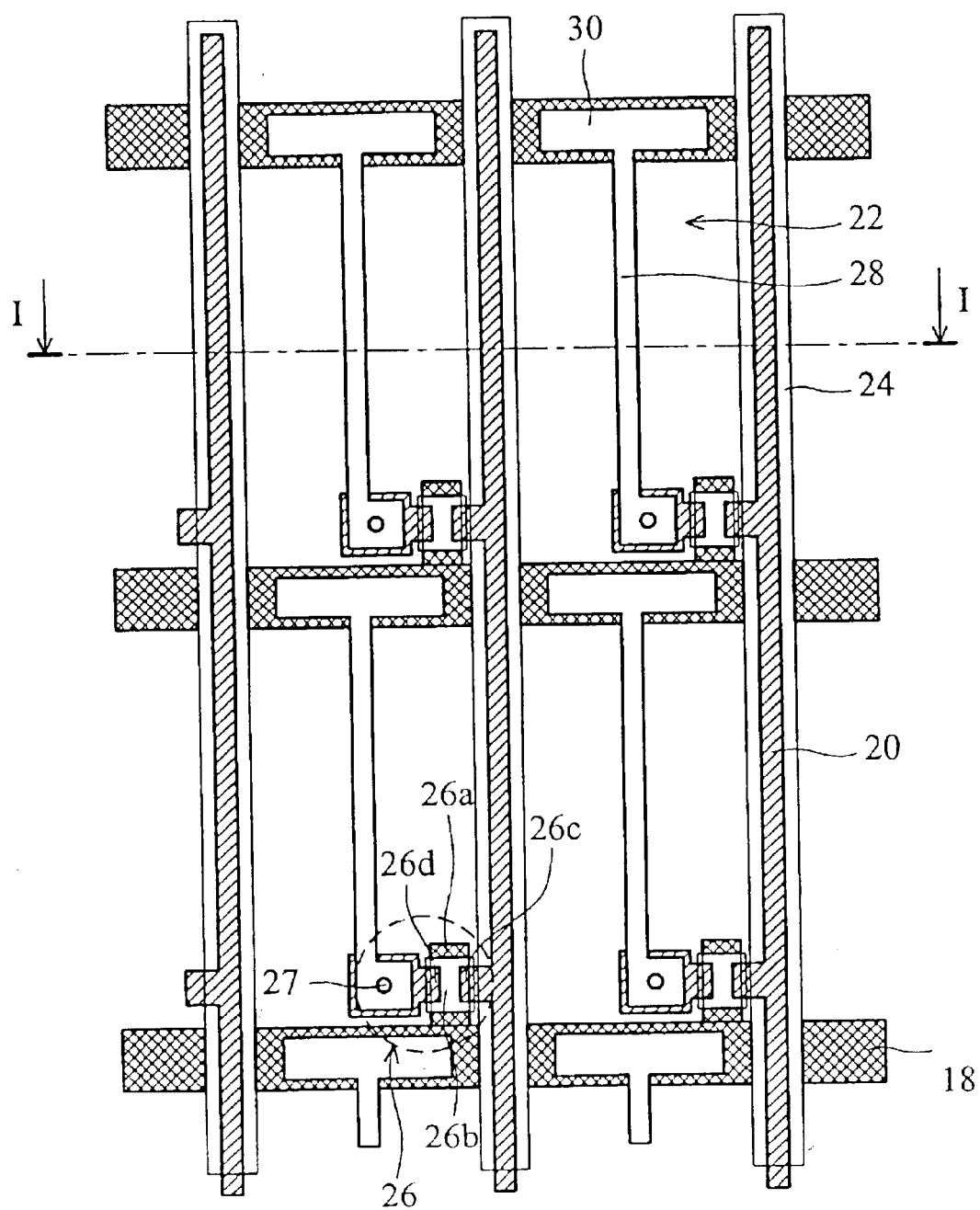
FIG. 1A is a plan view of a pixel structure of a conventional IPS-LCD.
Figure 1B:
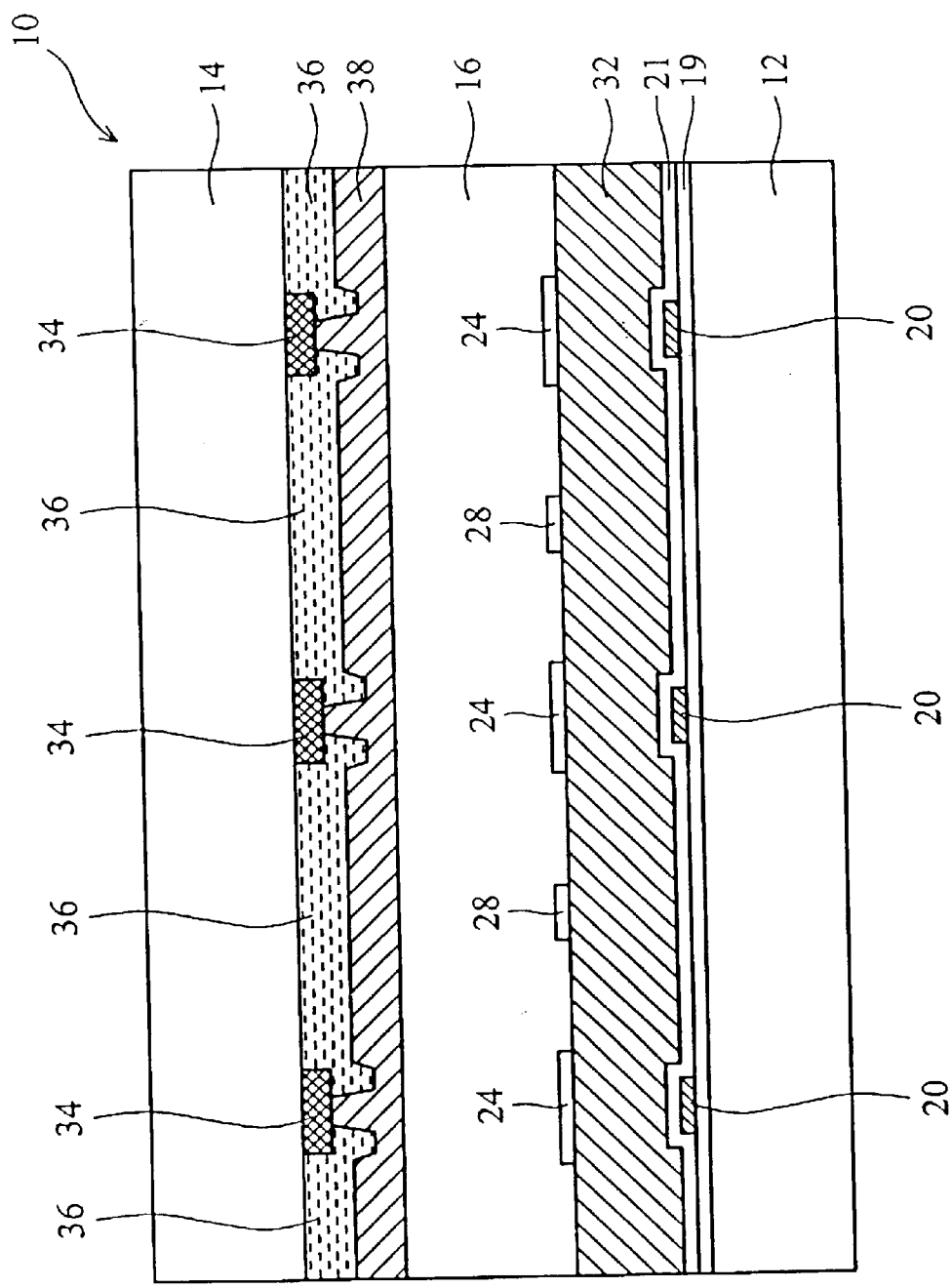
FIG. 1B is a sectional view according to line I—I of FIG. 1A.
Figure 2A:
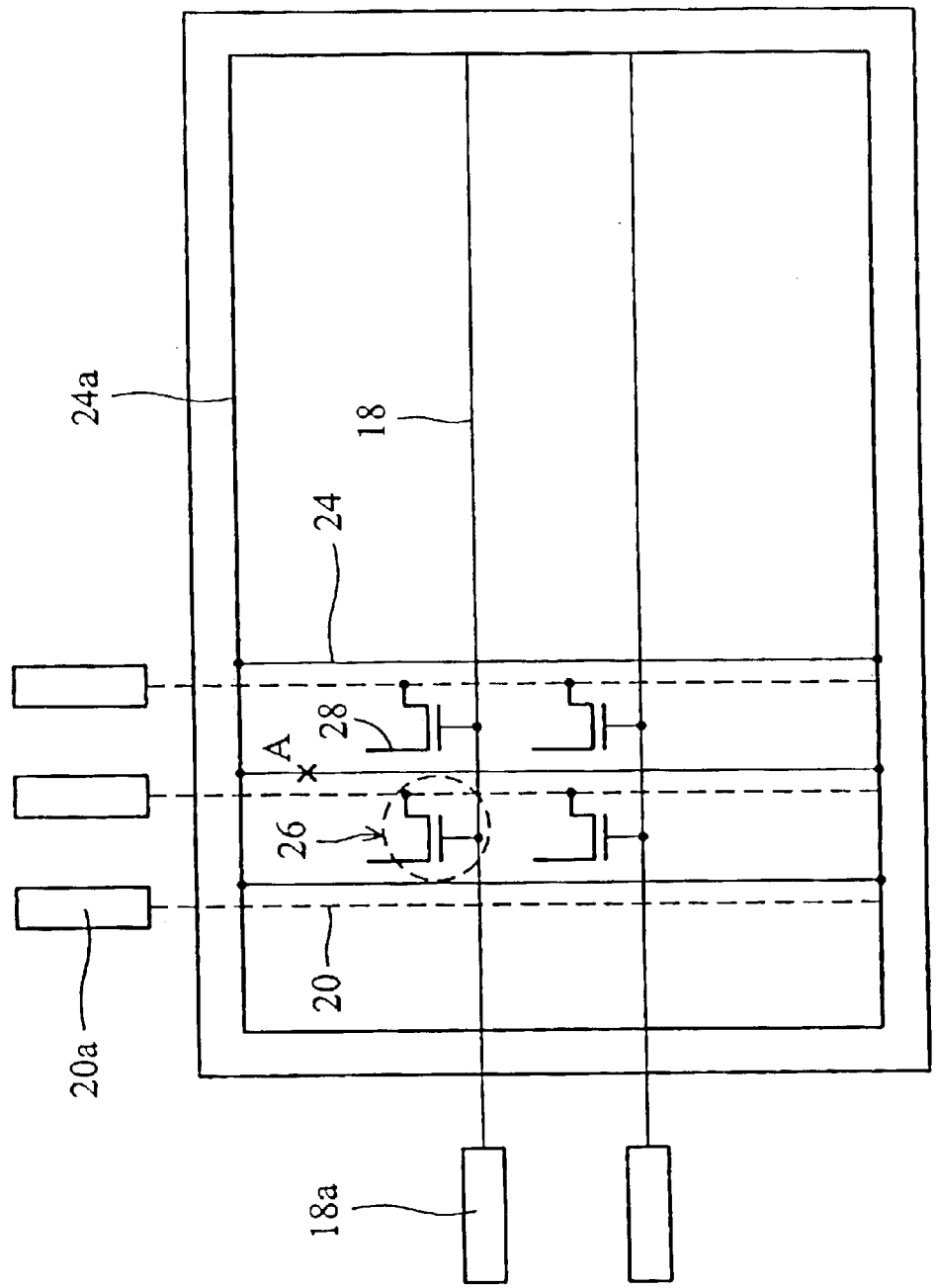
FIG. 2A is a circuit diagram showing an opened common electrode line according to the pixel structure of FIG. 1A.
Figure 2B:
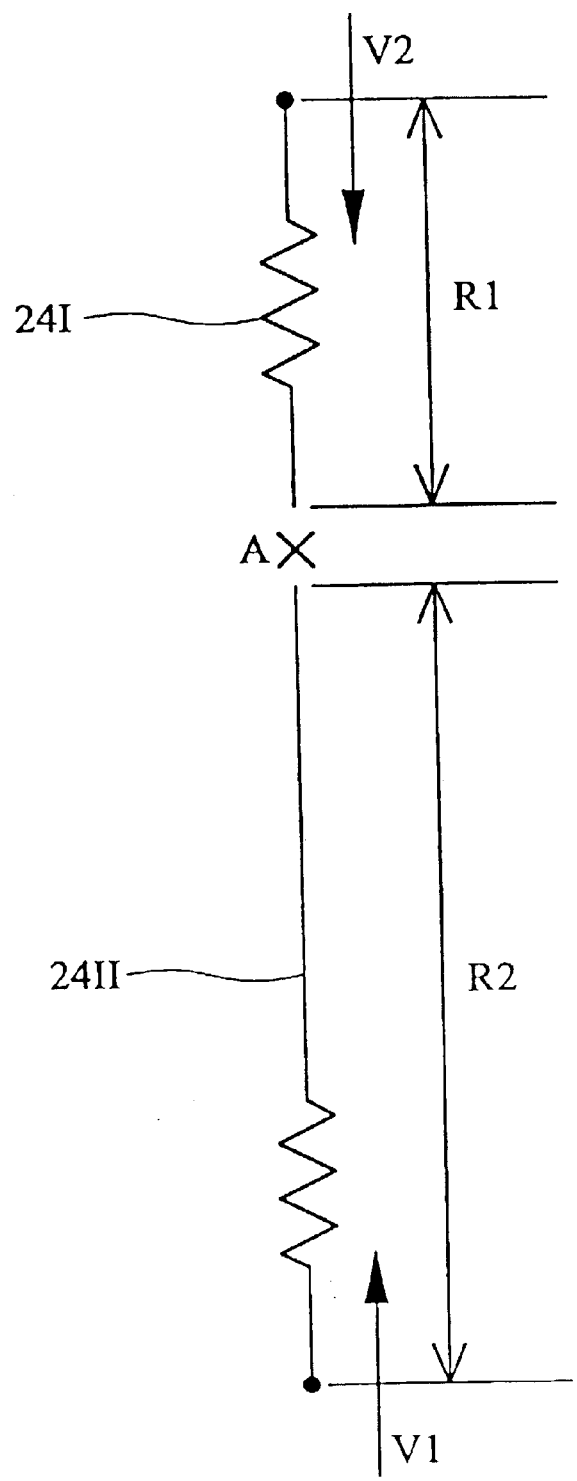
FIG. 2B is a circuits diagram showing different resistances and voltage applied to the opened common electrode line of FIG. 2A.
Figure 3A:
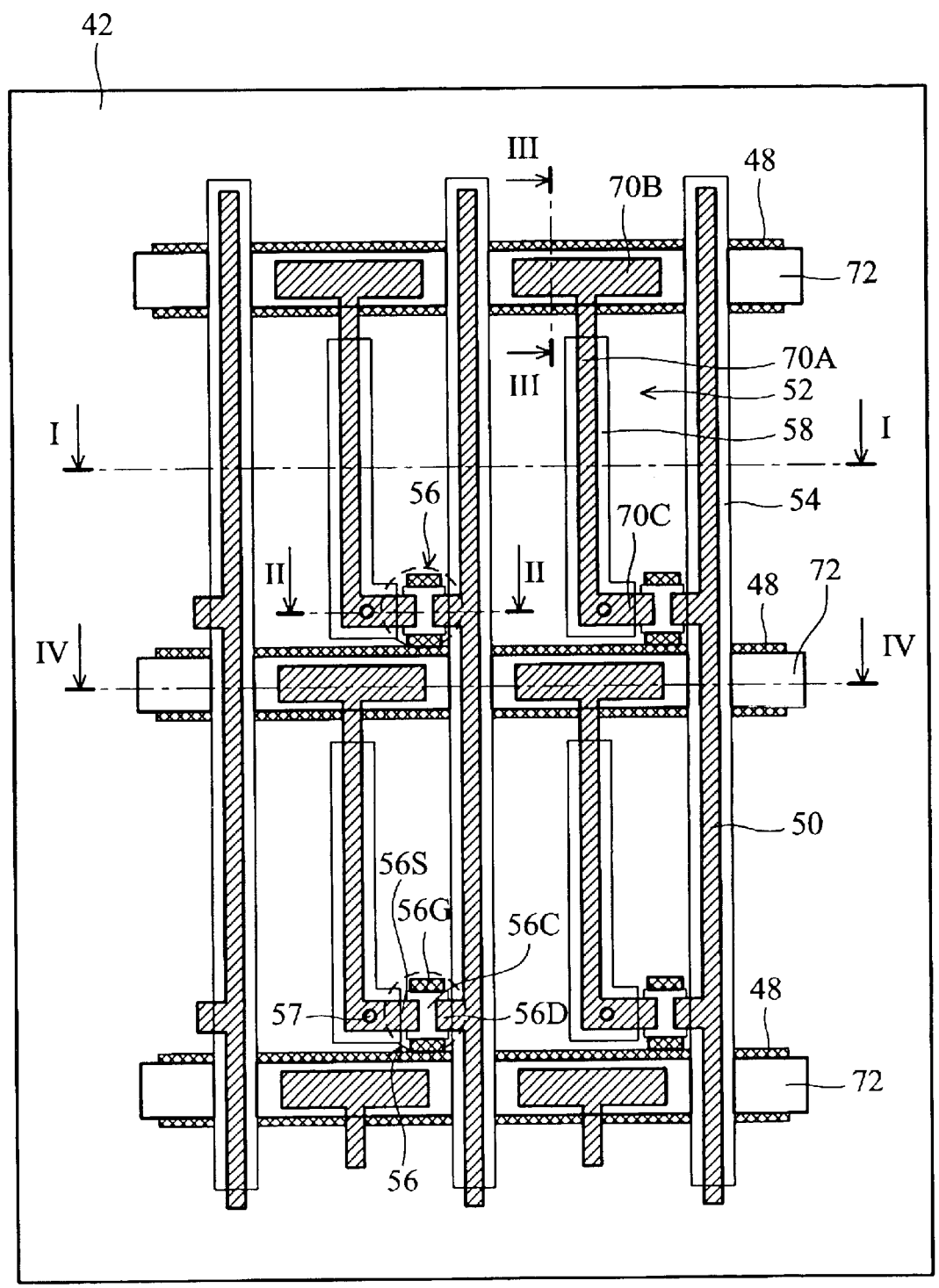
FIG. 3A is a plan view of a pixel structure of an IPS-LCD according to the present invention.
Figure 3B:
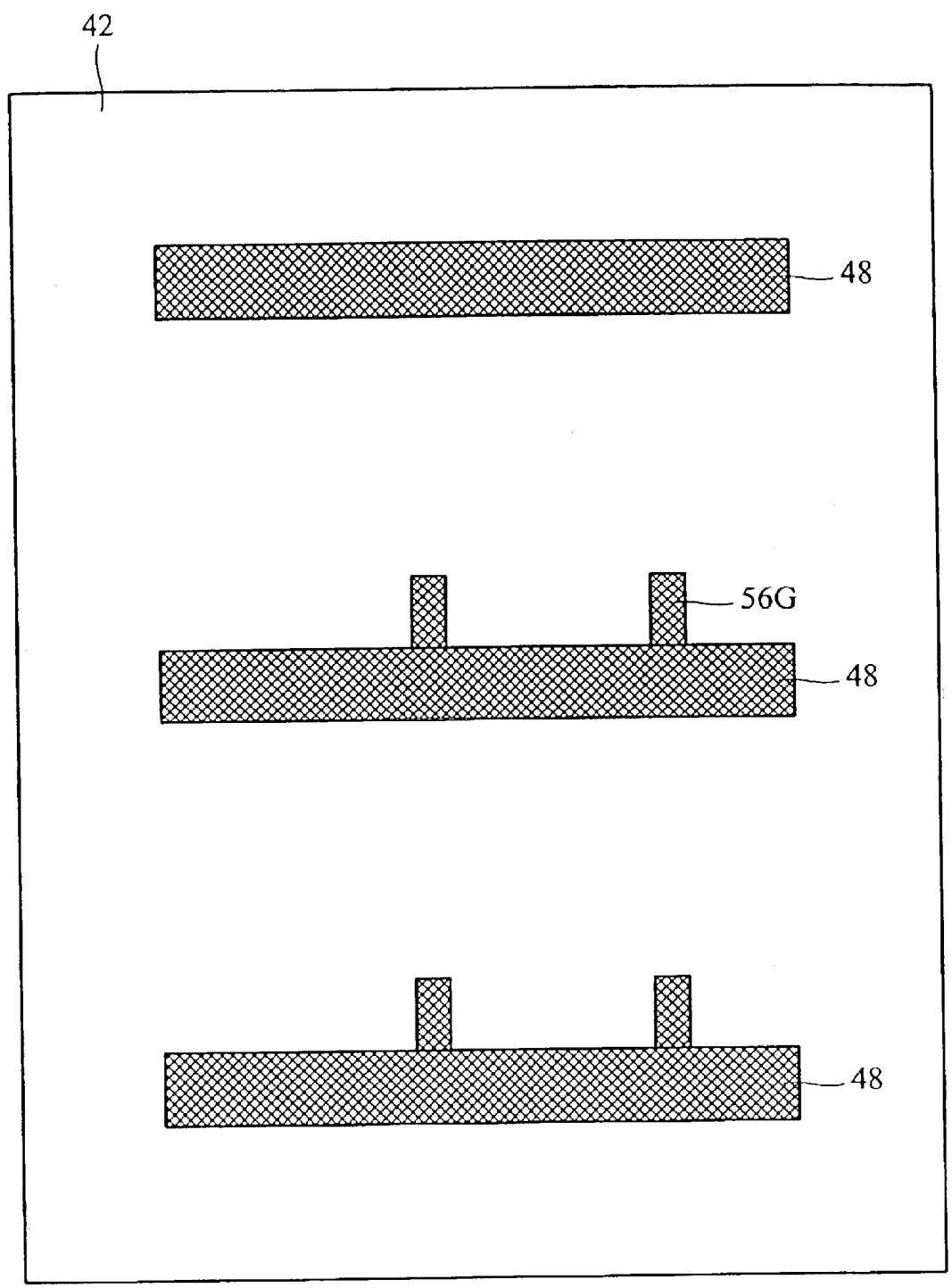
FIG. 3B is a top view of gate lines of an IPS-LCD according to the present invention.
Figure 3C:
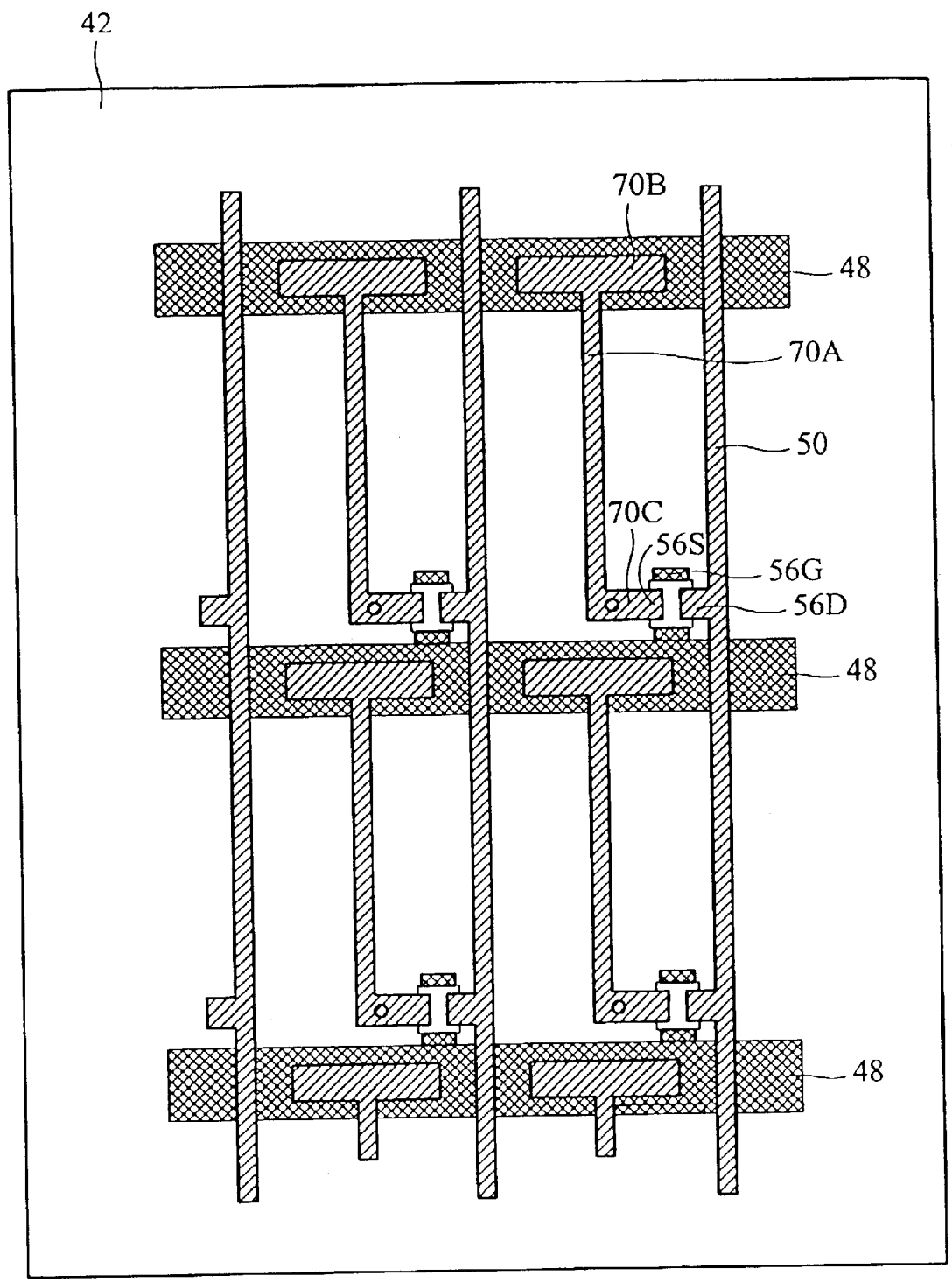
FIG. 3C is a top view of signal lines and complementary electrode patterns of an IPS-LCD according to the present invention.
Figure 3D:
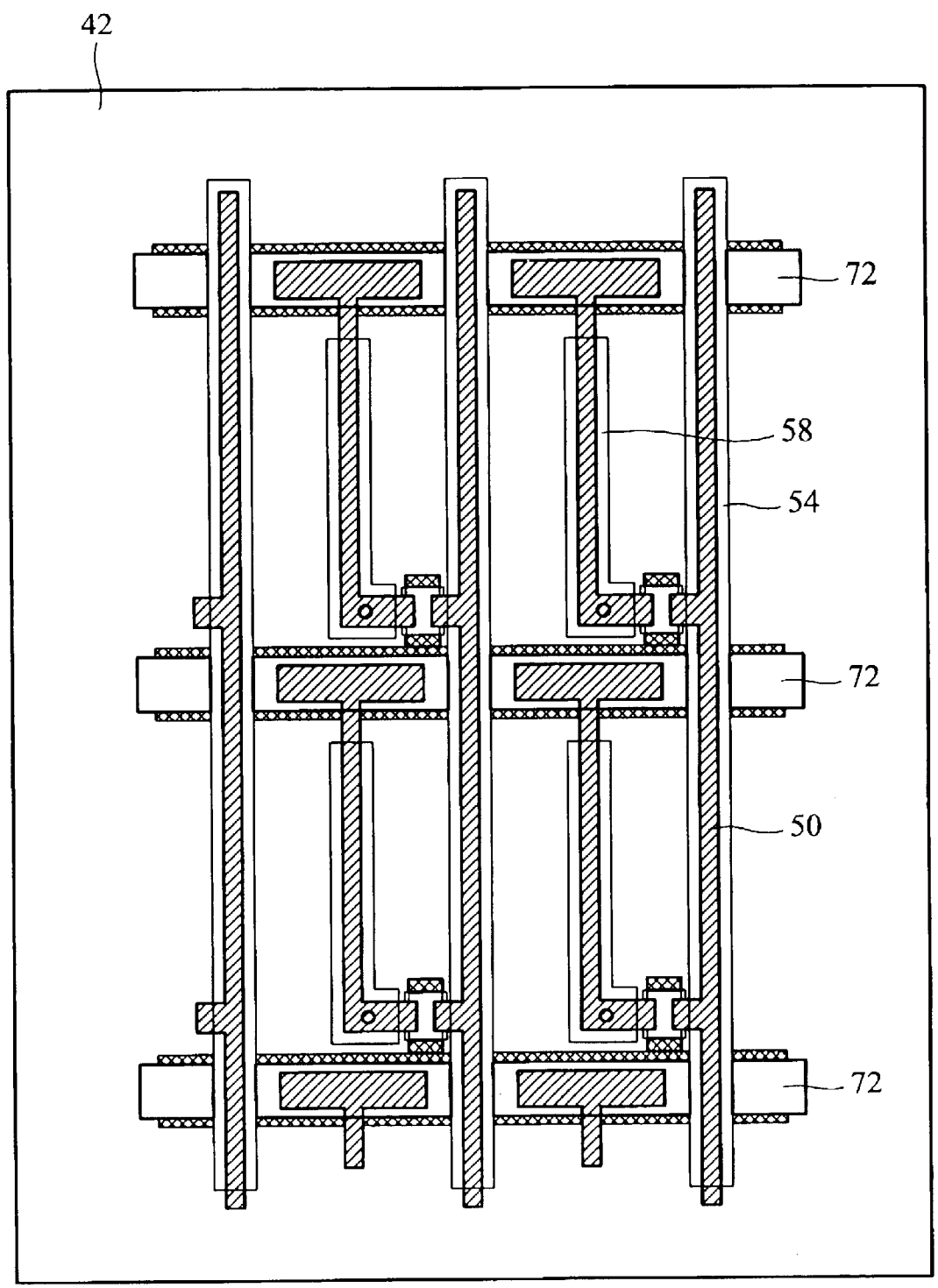
FIG. 3D is a top view of common electrodes and pixel electrodes of an IPS-LCD according to the present invention.

FIG. 3A is a plan view of a pixel structure of an IPS-LCD according to the present invention. FIG. 3B is a top view of gate lines of an IPS-LCD according to the present invention. FIG. 3C is a top view of signal lines and complementary electrode patterns of an IPS-LCD according to the present invention. FIG. 3D is a top view of common electrodes and pixel electrodes of an IPS-LCD according to the present invention.

Figure 4A:
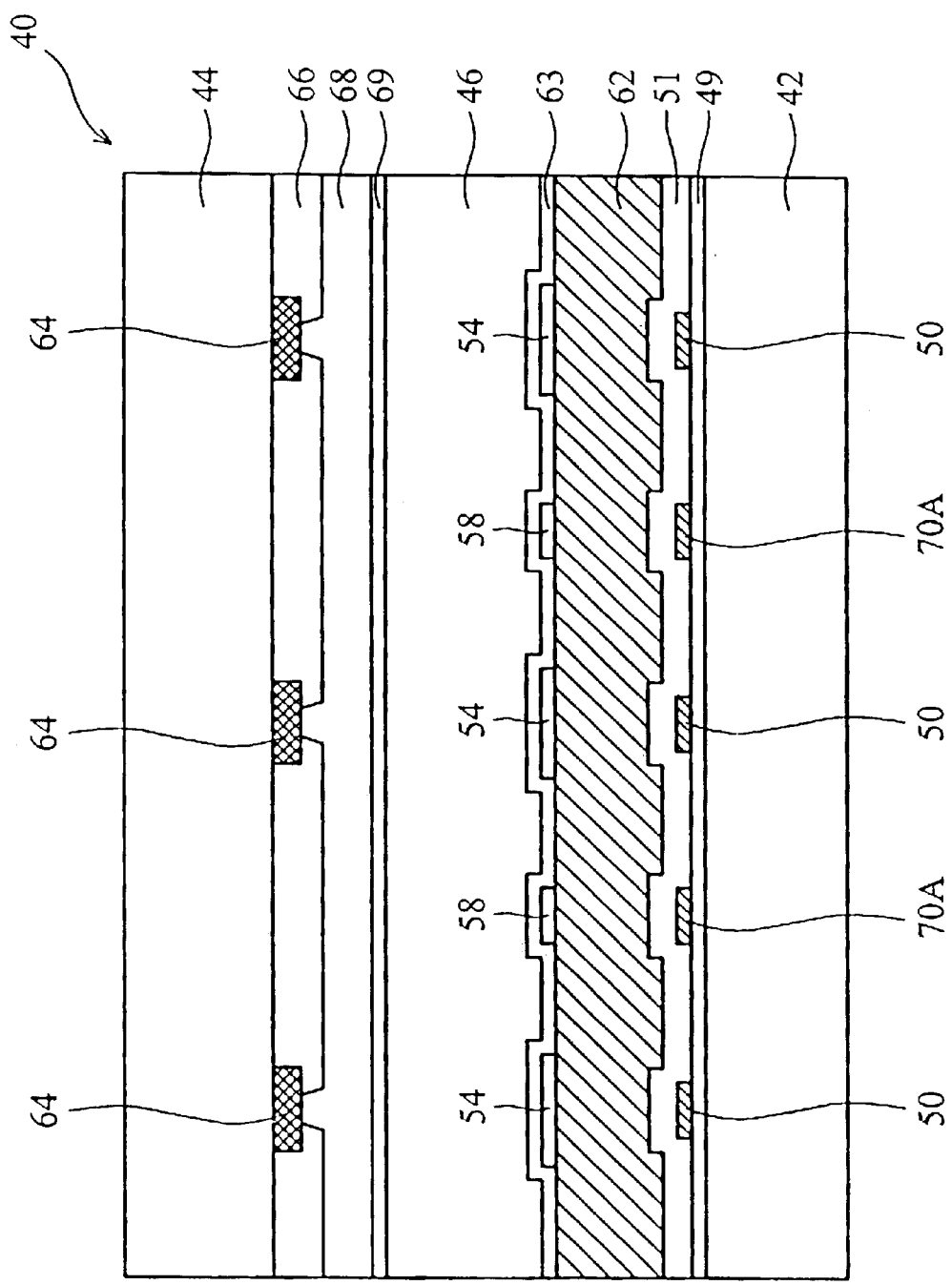
FIG. 4A is a sectional view according to line I—I of FIG. 3A.
Figure 4B:
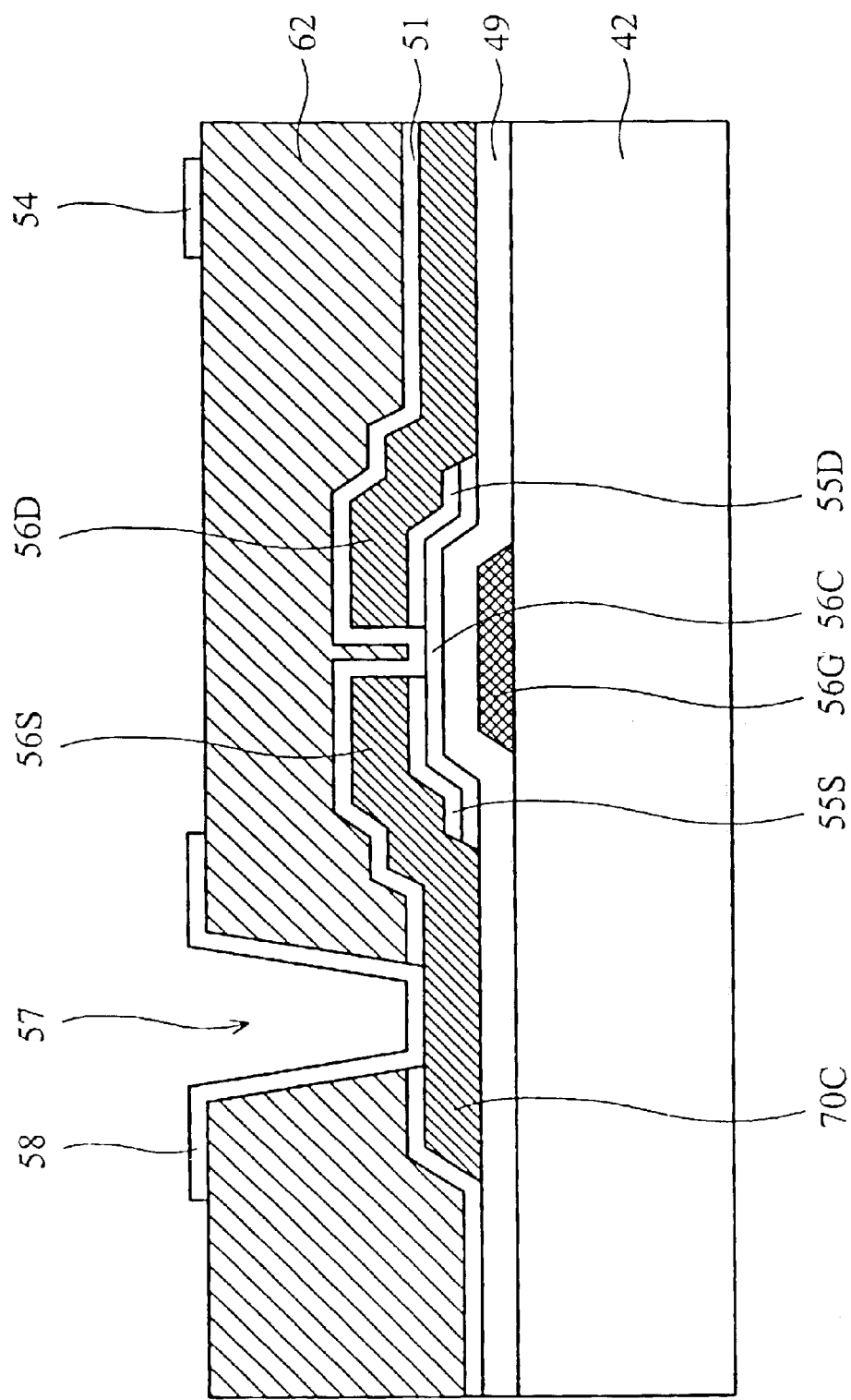
FIG. 4B is a sectional view according to line II—II of FIG. 3A.
Figure 4C:
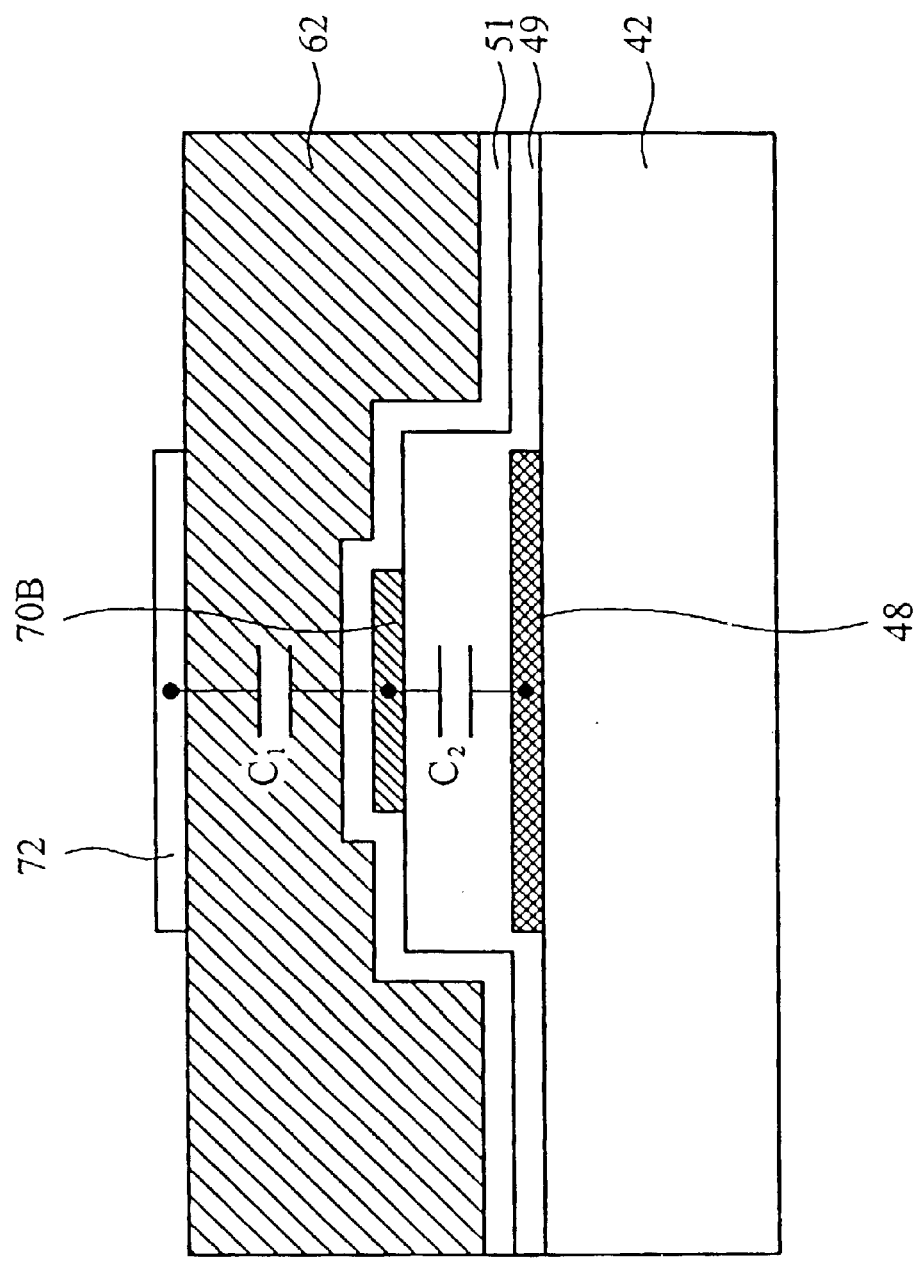
FIG. 4C is a sectional view according to line III—III of FIG. 3A.
Figure 4D:
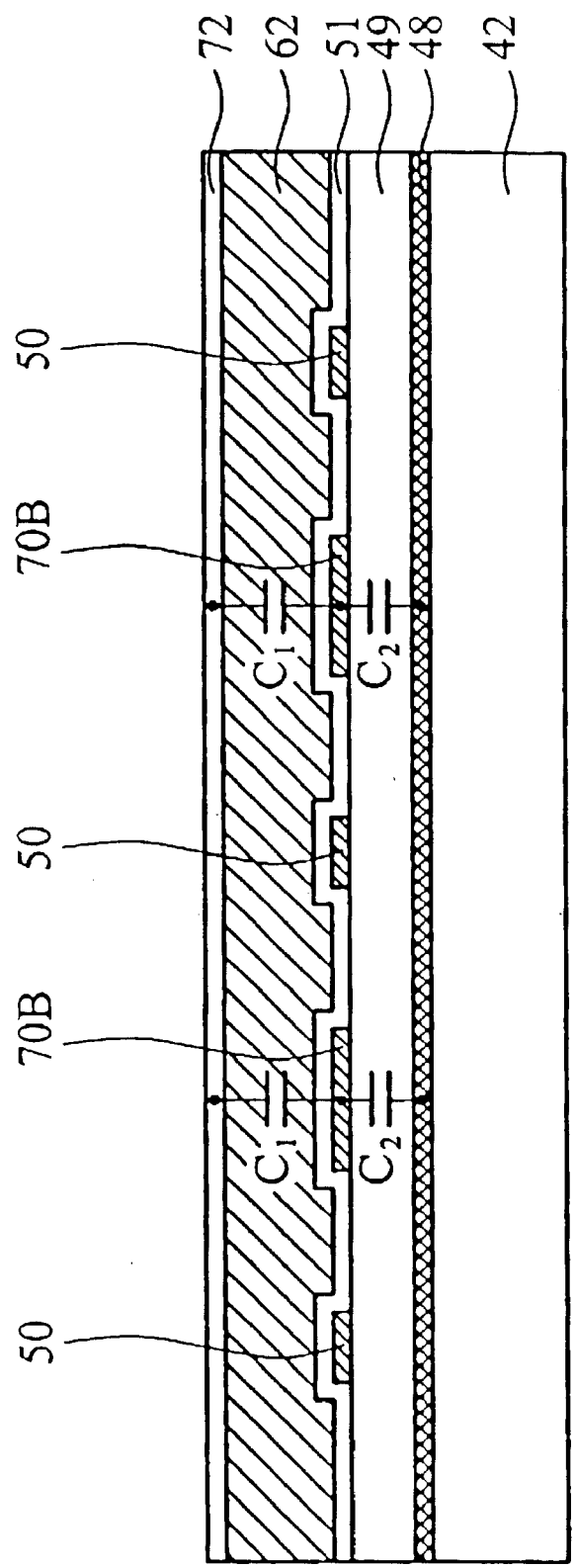
FIG. 4D is a sectional view according to line IV—IV of FIG. 3A.

FIG. 4A is a sectional view according to line I—I of FIG. 3A. FIG. 4B is a sectional view according to line II—II of FIG. 3A. FIG. 4C is a sectional view according to line III—III of FIG. 3A. FIG. 4D is a sectional view according to line IV—IV of FIG. 3A.

As shown in FIG. 4A, an IPS-LCD 40 comprises a pair of glass substrates 42 and 44, and a liquid crystal layer 46 formed in a space between the two glass substrates 42 and 44. As shown in FIG. 3A, on the bottom glass substrate 42, a plurality of gate lines 48 and a plurality of signal lines 50 are perpendicularly arranged in a matrix form to define a plurality of pixels 52. In the pixel 52, a common electrode line 54 extends parallel to the signal lines 50 and overlaps the signal line 50, a thin film transistor (TFT) 56 is formed adjacent a cross point of the gate line 48 and the signal line 50, and a pixel electrode 58 is parallel to the common electrode line 54 in the center of the pixel 52.

Also, a plurality of complementary electrode patterns 70 is formed in the pixels 52, respectively. Each complementary electrode pattern 70 comprises a strip portion 70A, a bar portion 70B and an extension portion 70C. The strip portion 70A is parallel to the pixel electrodes 58 and underneath the pixel electrode 58 to serve as another part of the pixel electrode. The bar portion 70B is parallel to the gate line 48 and overlaps a predetermined area of the gate line 48 to serve as a storage capacitor area. The extension portion 70C is formed on the TFT 56. Furthermore, a plurality of common bus lines 72 is formed to be parallel to the gate lines 48 and overlaps the gate lines 48, respectively. The common bus lines 72 are electrically connected to the common electrode lines 54, thus a redundancy path can be easily provided to go around a line defect point found in one common electrode line.

Hereinafter, a process of forming the electrode array shown in FIG. 3A is described. As shown in FIG. 3B, a first conductive layer is deposited and patterned on the bottom substrate 42 to serve as the gate lines 48 that extends along a first direction. Also, a protrusion of each gate line 48 serves as a gate electrode 56G of the TFF 56. Then, as shown in FIG. 3C, a second conductive layer is deposited and patterned over the first conductive to serve as the signal lines 50 and the complementary electrode patterns 70, in which the signal line 50 extends along a second direction that is perpendicular to the first direction. Also, a protrusion of the signal line 50 serves a drain electrode 56D of the TFT 56. Moreover, the strip portion 70A is parallel to the signal line 50 to serve as another part of the pixel electrode, the bar portion 70B is parallel to the gate line 48 and overlaps a predetermined area of the gate line 48 to serve as a storage capacitor area, and the extension portion 70C serves as a source electrode 56S of the TFT 56. Thereafter, as shown in FIG. 3D, a third conductive layer is deposited and patterned over the second conductive layer to serve as the common electrode lines 54, the pixel electrodes 58 and the common bus lines 72. The common electrode line 54 extends parallel to the signal lines 50 and overlaps the signal line 50. The pixel electrode 58 is parallel to the common electrode line 54 and located in the center of the pixel 52. The common bus line 72 is parallel to the gate line 48 and overlaps the gate line 48. Also, the common bus lines 72 are electrically connected to the common electrode lines 54.

As shown in FIG. 4A, preferably, the signal line 50 and the complementary electrode pattern 70 are formed on the same plane by using a non-transparent material, such as MoW or AlNd. The common electrode line 54, the pixel electrode 58 and the common bus line 72 are patterned on the same plane by using a transparent material, such as ITO or IZO.

As shown in FIG. 4A, a gate insulating layer 49 is deposited on the bottom glass substrate 42 to cover the gate lines 48. A passivation layer 51 is deposited on the gate insulating layer 49 to cover the signal lines 50 and the complementary electrode patterns 70. A resin insulator 62 is formed between the passivation layer 51 and the common electrode lines 54. This resin insulator 62 decreases the delay time of the signal line 50, and minimizes the coupling capacitance between the signal line 50 and the common electrode line 54. A first alignment layer 63 is formed on the entire surface of the bottom substrate 42 to face the liquid crystal layer 46.

On the upper glass substrate 44, a black matrix 64 is formed to prevent light leakage generated from the TFT 56, the gate line 48, and the signal line 50. A color filter layer 66 and an over-coat layer 68 are formed on the black matrix 64 in sequence. A second alignment layer 69 is formed on the entire surface of the upper glass substrate 44 to face the liquid crystal layer 46.

As shown in FIG. 3A and FIG. 4B, the TFT 56 includes a gate electrode 56G protruded from the gate line 48, the gate insulating layer 49 deposited on the gate electrode 56G, a channel layer 56C of an amorphous silicon (a-Si:H) material patterned on the gate insulating layer 49, a source/drain diffusion region 55S/55D of an $n^+$-doped amorphous silicon ($n^+$ a-Si:H) material patterned on the channel layer 56C, and a source/drain electrode 56S/56D patterned on the source/drain diffusion region 55S/55D. The drain electrode 56D is an extension of the signal line 50, the source electrode 56S is an extension of the extension portion 70C, and the pixel electrode 58 is electrically connected to the extension portion 70C through a via hole 57.

As shown in FIG. 3A, FIG. 4C and FIG. 4D, the bar portion 70B of the complementary electrode pattern 70 is disposed between the gate line 48 and the common bus line 72. Since the resin insulator 62 and the passivation layer 51 are sandwiched between the common bus line 72 and the bar portion 70B, a first storage capacitor structure is completed to provide a first capacitance $C_1$. Also, since the gate insulating layer 49 sandwiched between the bar portion 70B and the gate line 48, a second storage capacitor structure is completed to provide a second capacitance $C_2$. Therefore, the two storage capacitor structures are staggered to further prevent the IPS-LCD 40 from a gray inversion, a flicker, and an afterimage.

For achieving a higher resolution, the IPS-LCD 40 with the resin insulator 62 formed between the signal line 50 and the common electrode line 54 can decrease the delay time of the signal line 50 and minimize the coupling capacitance between the signal line 50 and the common electrode line 54. Also, the IPS-LCD 40 with the bar portion 70B formed between the gate line 48 and the common bus line 72 can provide two storage capacitor structures to achieve a higher capacitance than that of the conventional IPS-LCD.

In addition, the IPS-LCD with the common bus line 72 electrically connected to the common electrode line 54 can provide a redundancy structure for an opened common electrode line. This redundancy structure is described as follows.

Figure 5:
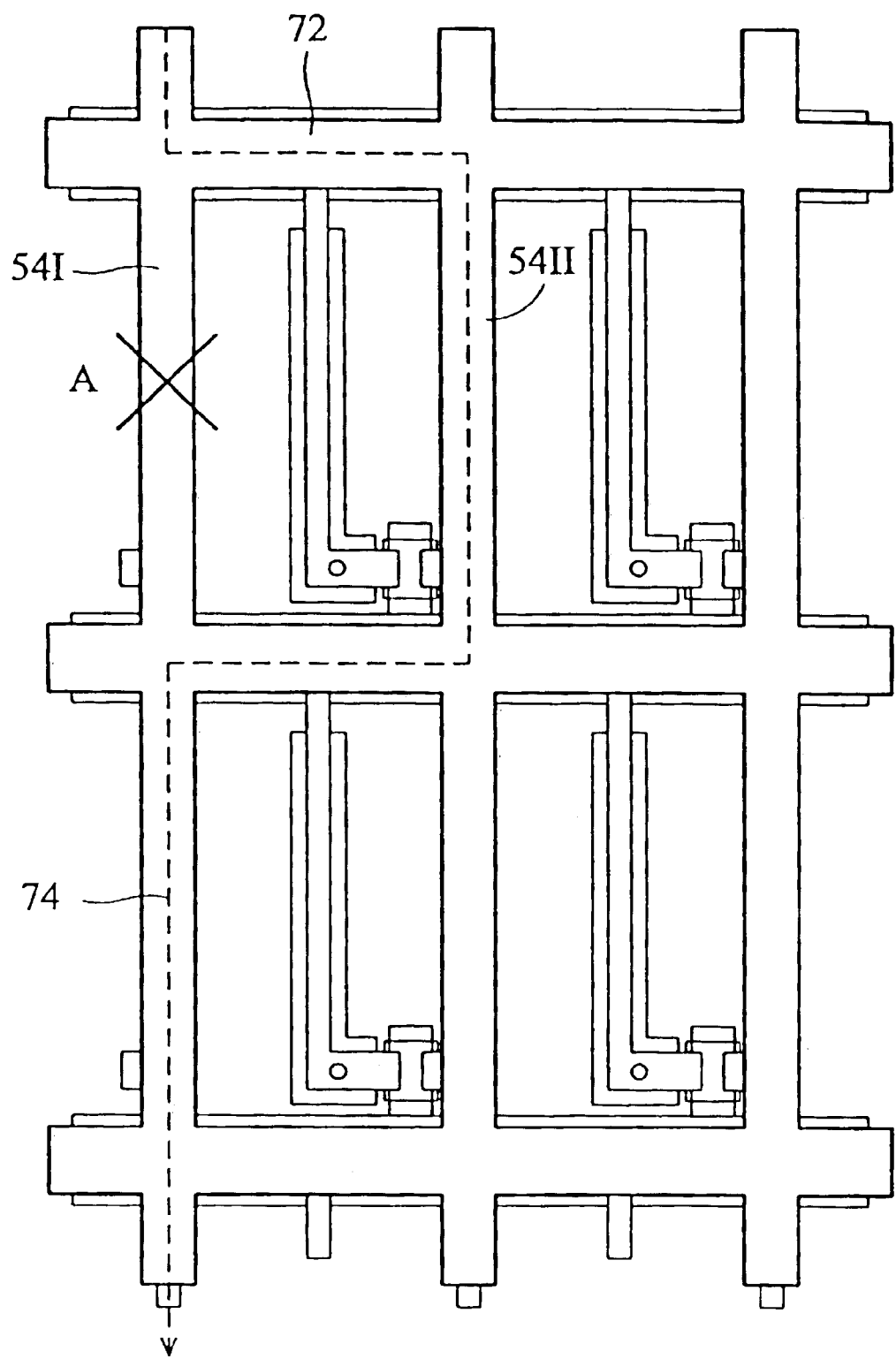
FIG. 5 is plane view showing a redundancy structure for an opened common electrode line according to the pixel structure of FIG. 3.

FIG. 5 is plane view showing a redundancy structure for an opened common electrode line according to the pixel structure of FIG. 3. The common electrode lines 54 and the common bus lines 72 are perpendicular to each other and formed on the same plane to electrically connected to each other, thus serving as a redundancy pattern. When a line defect point A is found in one line 54I of the common electrode line 54, the line 54I is opened and viewed as a defect line. Since the common bus line 72 electrically connected to the common electrode line 54, a redundancy path 74 along the adjacent line 54II of the common electrode line 54 is provided to go around the point A.

It is to be understood that the present invention is not limited to the embodiments described above, but encompasses any and all embodiments within the scope of the following claims.

What is claimed is:

1. An IPS-LCD array substrate, comprising:
   a plurality of gate lines and a plurality of signal lines perpendicularly arranged in a matrix form to define a plurality of pixels;
   a plurality of TFTs formed in the plurality of pixels, respectively;
   a redundancy pattern comprising a plurality of common electrode lines extending parallel to the signal lines and a plurality of common bus lines extending parallel to the gate lines, in which the common electrode lines overlap the signal lines respectively, the common bus lines overlap the gate lines respectively, and the common bus lines are electrically connected to the common electrode lines;
   a plurality of pixel electrodes disposed parallel to the common electrode lines in the plurality of pixels, respectively;
   a plurality of complementary electrode patterns formed in the plurality of pixels respectively; and
   an insulator sandwiched between the common electrode lines and the signal lines;
   wherein, the signal lines and the complementary electrode patterns are formed on the same plane, the common electrode lines, and the pixel electrodes and the common bus lines are patterned on the same plane.

2. The IPS-LCD array substrate according to claim 1, wherein each of the complementary electrode patterns comprises a strip portion underneath and parallel to the pixel electrode, a bar portion parallel to the gate line and between the common bus line and the gate line, and an extension portion formed on the TFT and electrically connected to the pixel electrode.

3. The IPS-LCD array substrate according to claim 1, further comprising:
   a gate insulating layer covering the gate lines, wherein the signal lines and the complementary electrode patterns are patterned on the gate insulating layer.

4. The IPS-LCD array substrate according to claim 3, further comprising:
   a passivation layer deposited on the gate insulating layer and covering the signal lines and the complementary electrode patterns, wherein the insulator is deposited on the passivation layer.

5. The IPS-LCD array substrate according to claim 1, wherein the TFT comprises:
   a gate electrode protruded from the gate line;
   a gate insulating layer deposited on the gate electrode,
   a channel layer of a first semiconductor layer patterned on the gate insulating layer;
   a source/drain diffusion region of a second semiconductor layer patterned on the channel layer; and
   a source/drain electrode patterned on the source/drain diffusion region, respectively, in which a portion of the drain electrode is exposed by a via hole to form an electrical connection between the pixel electrode and the drain electrode;
   wherein, the drain electrode is an extension of the signal line, the source electrode is an extension of the extension portion of the complementary electrode pattern, and the pixel electrode is electrically connected to the extension portion through the via hole.

6. The IPS-LCD array substrate according to claim 5, wherein the channel layer is an amorphous silicon (a-Si:H) material, and the source/drain diffusion region is an $n^+$-doped amorphous silicon ($n^+$ a-Si:H) material.

7. The IPS-LCD array substrate according to claim 1, wherein the signal lines and the complementary electrode patterns are formed by using a non-transparent conductive material.

8. The IPS-LCD array substrate according to claim 7, wherein the signal lines and the complementary electrode patterns are formed by using MoW or AlNd.

9. The IPS-LCD array substrate according to claim 1, wherein the common electrode lines, and the pixel electrodes and the common bus lines are formed by using a transparent conductive material.

10. The IPS-LCD array substrate according to claim 9, wherein the common electrode lines, and the pixel electrodes and the common bus lines are formed by using ITO or IZO.

11. An IPS-LCD, comprising:
a first substrate and a second substrate parallel to each other;
a liquid crystal layer disposed in a space between the first substrate and a second substrate;
a plurality of gate lines and a plurality of signal lines perpendicularly arranged in a matrix form on the first substrate to define a plurality of pixels;
a plurality of TFTs formed in the plurality of pixels, respectively;
a redundancy pattern comprising a plurality of common electrode lines extending parallel to the signal lines and a plurality of common bus lines extending parallel to the gate lines, in which the common electrode lines overlap the signal lines respectively, the common bus lines overlap the gate lines respectively, and the common bus lines are electrically connected to the common electrode lines;
a plurality of pixel electrodes disposed parallel to the common electrode lines in the plurality of pixels, respectively;
a plurality of complementary electrode patterns formed in the plurality of pixels respectively; and
an insulator sandwiched between the common electrode lines and the signal lines;
wherein, the signal lines and the complementary electrode patterns are formed on the same plane, the common electrode lines, and the pixel electrodes and the common bus lines are patterned on the same plane.

12. The IPS-LCD according to claim 11, wherein each of the complementary electrode patterns comprises a strip portion underneath and parallel to the pixel electrode, a bar portion parallel to the gate line and between the common bus line and the gate line, and an extension portion formed on the TFT and electrically connected to the pixel electrode.

13. The IPS-LCD according to claim 11, further comprising:
a gate insulating layer deposited on the first substrate and covering the gate lines, wherein the signal lines and the complementary electrode patterns are patterned on the gate insulating layer.

14. The IPS-LCD according to claim 13, further comprising:
a passivation layer deposited on the gate insulating layer and covering the signal lines and the complementary electrode patterns, wherein the insulator is deposited on the passivation layer.

15. The IPS-LCD according to claim 11, wherein the TFT comprises:
a gate electrode protruded from the gate line;
a gate insulating layer deposited on the gate electrode,
a channel layer of a first semiconductor layer patterned on the gate insulating layer;
a source/drain diffusion region of a second semiconductor layer patterned on the channel layer; and
a source/drain electrode patterned on the source/drain diffusion region, respectively, in which a portion of the drain electrode is exposed by a via hole to form an electrical connection between the pixel electrode and the drain electrode;
wherein, the drain electrode is an extension of the signal line, the source electrode is an extension of the extension portion of the complementary electrode pattern, and the pixel electrode is electrically connected to the extension portion through the via hole.

16. The IPS-LCD according to claim 15, wherein the channel layer is an amorphous silicon (a-Si:H) material, and the source/drain diffusion region is an $n^+$-doped amorphous silicon ($n^+$ a-Si:H) material.

17. The IPS-LCD according to claim 11, wherein the signal lines and the complementary electrode patterns are formed by using a non-transparent conductive material.

18. The IPS-LCD according to claim 17, wherein the signal lines and the complementary electrode patterns are formed by using MoW or AlNd.

19. The IPS-LCD according to claim 11, wherein the common electrode lines, and the pixel electrodes and the common bus lines are formed by using a transparent conductive material.

20. The IPS-LCD according to claim 19, wherein the common electrode lines, and the pixel electrodes and the common bus lines are formed by using ITO or IZO.

* * * * *